(12) United States Patent
Ding et al.

(10) Patent No.: US 9,953,161 B2
(45) Date of Patent: Apr. 24, 2018

(54) METHOD, DEVICE AND SYSTEM FOR PROCESSING NOTIFICATION BAR MESSAGE

(71) Applicant: Beijing Qihoo Technology Company Limited, Beijing (CN)

(72) Inventors: Yi Ding, Beijing (CN); Yuan Li, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 185 days.

(21) Appl. No.: 14/766,095

(22) PCT Filed: Jan. 27, 2014

(86) PCT No.: PCT/CN2014/071594
§ 371 (c)(1),
(2) Date: Aug. 5, 2015

(87) PCT Pub. No.: WO2014/121714
PCT Pub. Date: Aug. 14, 2014

(65) Prior Publication Data
US 2015/0371040 A1 Dec. 24, 2015

(30) Foreign Application Priority Data
Feb. 6, 2013 (CN) .......................... 2013 1 0048831

(51) Int. Cl.
*G06F 21/55* (2013.01)
*G06F 21/56* (2013.01)

(52) U.S. Cl.
CPC ............ *G06F 21/554* (2013.01); *G06F 21/56* (2013.01); *G06F 2221/033* (2013.01)

(58) Field of Classification Search
CPC .... G06F 11/3416; G06F 21/554; G06F 21/56; G06F 2221/033; H04L 63/20; H04L 63/105; H04L 63/145
USPC ..................................................... 726/22, 23
See application file for complete search history.

(56) References Cited

U.S. PATENT DOCUMENTS 5,940,492 A * 8/1999 Galloway ............... H04M 3/48
379/221.13
7,028,072 B1 * 4/2006 Kliger ................... G06Q 30/02
709/203
7,305,709 B1 * 12/2007 Lymer ..................... G06F 21/56
714/E11.207

(Continued)

FOREIGN PATENT DOCUMENTS

CN      101114323     1/2008
CN      101359288     2/2009

(Continued)

*Primary Examiner* — Abu Sholeman
(74) *Attorney, Agent, or Firm* — Harness, Dickey & Pierce, P.L.C.

(57) ABSTRACT

Disclosed are a method, device and system for processing notification bar message, the method comprising: triggering an interception program pre-injected in a notification bar message process; and the interception program, when capturing a notification bar message satisfying a preset rule, intercepting the notification bar message satisfying the preset rule, and sending a prompt message. The disclosure can timely recognize and block a notification bar advertisement.

15 Claims, 3 Drawing Sheets

(56) References Cited

U.S. PATENT DOCUMENTS

| | | | | |
|---|---|---|---|---|
| 8,051,486 B2* | 11/2011 | Beresniewicz | G06F 21/554 | 726/22 |
| RE43,302 E * | 4/2012 | Dickinson, III | H04L 51/12 | 713/152 |
| 8,356,356 B2* | 1/2013 | Sabella | G06F 21/554 | 705/51 |
| 8,407,345 B2* | 3/2013 | Lim | G06F 9/468 | 709/225 |
| 8,479,286 B2* | 7/2013 | Dalcher | G06F 11/3466 | 726/22 |
| 8,863,279 B2* | 10/2014 | McDougal | H04L 63/1416 | 713/188 |
| 8,990,945 B1* | 3/2015 | Ranadive | H04L 63/1433 | 713/187 |
| 9,306,889 B2* | 4/2016 | Tang | H04L 51/12 | |
| 9,384,336 B1* | 7/2016 | Ashley | G06F 21/30 | |
| 2007/0050376 A1* | 3/2007 | Maida-Smith | G06F 17/3089 | |
| 2007/0113282 A1* | 5/2007 | Ross | G06F 21/52 | 726/22 |
| 2007/0157203 A1* | 7/2007 | Lim | G06F 9/468 | 718/100 |
| 2008/0184198 A1* | 7/2008 | Sabella | G06F 21/554 | 717/110 |
| 2009/0083761 A1* | 3/2009 | Mully | G06F 9/546 | 719/314 |
| 2009/0204681 A1* | 8/2009 | Sun | H04L 51/24 | 709/206 |
| 2009/0275314 A1* | 11/2009 | Cotevino | H04L 51/043 | 455/414.2 |
| 2011/0065419 A1* | 3/2011 | Book | G06F 21/305 | 455/411 |
| 2011/0066608 A1* | 3/2011 | Graham, Jr. | G06F 17/3089 | 707/708 |
| 2011/0154364 A1* | 6/2011 | Vaddagiri | G06F 9/468 | 719/313 |
| 2011/0184813 A1* | 7/2011 | Barnes | G06F 17/30867 | 705/14.66 |
| 2012/0054859 A1* | 3/2012 | Andersen | H04L 51/12 | 726/22 |
| 2012/0203639 A1* | 8/2012 | Webster | G06Q 30/0269 | 705/14.66 |
| 2013/0019185 A1* | 1/2013 | Zhang | G06Q 10/109 | 715/752 |
| 2013/0212159 A1* | 8/2013 | Vandikas | H04L 67/2819 | 709/203 |
| 2013/0339158 A1* | 12/2013 | Xie | G06Q 30/0248 | 705/14.73 |
| 2014/0378104 A1* | 12/2014 | Song | H04W 4/14 | 455/412.2 |
| 2015/0169872 A1* | 6/2015 | Ding | G06F 21/54 | 726/22 |
| 2015/0244736 A1* | 8/2015 | Shao | G06F 9/44526 | 726/23 |

FOREIGN PATENT DOCUMENTS

| | | |
|---|---|---|
| CN | 101667235 | 3/2010 |
| CN | 102693394 | 9/2012 |
| CN | 102693395 | 9/2012 |
| CN | 102752730 | 10/2012 |
| CN | 103116722 | 5/2013 |

* cited by examiner

METHOD, DEVICE AND SYSTEM FOR PROCESSING NOTIFICATION BAR MESSAGE

FIELD OF THE INVENTION

The disclosure relates to the field of message processing and particularly to a method for processing a notification bar message, a device for processing a notification bar message, a system for processing a notification bar message, a computer program, and a computer readable medium.

BACKGROUND OF THE INVENTION

Terminal applications have grown explosively along with the popularization of smart terminals. However, developers of a number of applications have still lost money in business due to the openness of terminal operating systems and rampant pirating, so various third-party advertisement Software Development Kits (SDKs) have become the predominant means and even the only means for the majority of the developers to make profit. In order to earn money rapidly, some developers may not care about jeopardizing experiences of users by embedding a large number of malicious advertisements anonymously pushed, forced to be downloaded, and impossible to be cleared/closed and even consuming money secretly.

A notification bar advertisement is a new advertisement approach in which a notification bar message is sent to a smart phone via an open notification bar message interface of the Android system or another open operating system. Due to a defect in the design of the Android smart terminal, if software sending the notification bar message does not point out the sender's identity to the user on its own initiative, then the user of the terminal will not know which f software has sent the notification bar advertisement, so a lot of malicious software will send such messages frequently to annoy the user to force the user to view the advertisement, and induce the user to download the software pushed by the advertisement.

Thus it is desirable for those skilled in the art to address the technical problem of providing a mechanism of identifying and intercepting a notification bar message so as to identify and intercept a notification bar advertisement in a timely manner.

SUMMARY OF THE INVENTION

In view of the problem above, the disclosure has been made to provide a method for processing a notification bar message, and a corresponding device and system, a computer program, and a computer readable medium, which can overcome or at least partly address the problem.

According to an aspect of the disclosure, there is provided a method for processing a notification bar message, the method including:
  triggering an interception program pre-injected in a notification bar message process; and
  the interception program, when capturing a notification bar message satisfying a preset rule, intercepting the notification bar message satisfying the preset rule, and sending a prompt message.

According to another aspect of the disclosure, there is provided a device for processing a notification bar message, the device including:
  a triggering module configured to trigger an interception program pre-injected in a notification bar message process; and
  an interception module in the interception program, configured to intercept a notification bar message satisfying a preset rule and to send a prompt message when capturing the notification bar message satisfying the preset rule.

According to another aspect of the disclosure, there is provided a system for processing a notification bar message, the system including a triggering module and an intercepting module, wherein
  the triggering module is configured to trigger an interception program pre-injected into a notification bar message process; and
  the intercepting module is configured to determine whether a notification bar message is a notification bar message satisfying a preset rule, to intercept the notification bar message satisfying the preset rule, and to send a prompt message when capturing the notification bar message.

According to another aspect of the disclosure, there is provided a computer program including computer readable codes which cause the mobile terminal to perform the method for processing a communication request of a mobile terminal according to any one of claims 1 to 8, when running on a mobile terminal.

According to another aspect of the disclosure, there is provided a computer readable medium with a computer program stored thereon.

Advantageous effects of the disclosure are as follows:

A method, device, and system for processing a notification bar message according to the disclosure can inject a interception program by obtaining the advanced privilege of the mobile terminal system, after detecting that the operating system is adjusted in privilege, so that the interception program can be used to monitor and intercept a notification bar message with a malicious advertisement plug-in or a malicious advertisement feature, to obtain information about the application sending the notification bar message, and to prompt the user. Thereby such a problem in the prior art is addressed that a malicious application may send notification bar messages with advertisements frequently to annoy the user to force the user to view the advertisements, and induce the user to download the software pushed by the advertisements, and thus such advantageous effects are achieved that the user is prompted on time when the interception program captures a malicious notification bar message, and the notification bar message is blocked from being passed and displayed on time according to the user's determination, so that the user is prevented from interference and the unnecessary loss is avoided.

Only the summary of the technical solution of the disclosure has been described above, and particular embodiments of the disclosure will be described below in order to enable the technical solution of the disclosure to become more apparent and to be put into practice in light of the disclosure of the description, and in order to make the foregoing and other objects, features and advantages of the disclosure more apparent.

BRIEF DESCRIPTION OF DRAWINGS

Various other advantages and benefits will become apparent to those ordinarily skilled in the art upon review of the following detailed description of preferred embodiments. The drawings are merely intended to illustrate the preferred

DETAILED DESCRIPTION OF THE INVENTION

Figure 1:
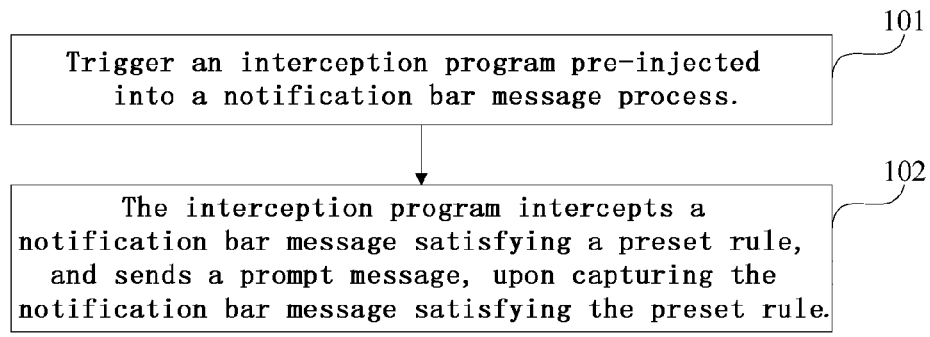
FIG. 1 illustrates schematically a flow diagram of steps in a first embodiment of a method for processing a notification bar message according to an embodiment of the disclosure.

Exemplary embodiments of the disclosure will be described below in further details with reference to the drawings. Although the exemplary embodiments of the disclosure are illustrated in the drawings, it shall be appreciated that the disclosure can be embodied in various forms but will not be limited to the embodiments described here. On the contrary these embodiments are provided so that the disclosure can become more apparent and the scope of the disclosure can be conveyed fully to those skilled in the art.

One of core ideas of the embodiments of the disclosure lies on that after it is detected that an operating system of a mobile terminal has been adjusted in privilege or has owned a manufacturer preset privilege, an interception program is injected by obtaining the advanced privilege of the system, to enhance interception of a notification bar message carrying advertisement information, thus preventing a user from interference.

Referring to FIG. 1, it is illustrated a flow diagram of steps in a first embodiment of a method for processing a notification bar message according to an embodiment of the disclosure, and the principle of the disclosure will be described in this embodiment by way of an example in which there is a smart terminal installed with the Android system, while this description is merely exemplary, the scope of the disclosure will not be limited thereto, and the principle of the disclosure can also be applicable to a smart terminal installed with another operating system (e.g., Linux, iOS, Window Phone, Symbian, etc.), where the method can particularly include the following steps:

The step 101 is triggering an interception program pre-injected into a notification bar message process.

With regard to the operating system, the operating system classifies users into six groups and grants a different operating privilege to each group, orderly which are a group of administrators (Administrators), a group of power users (Power Users), a group of normal users (Users), a group of backup operators (Backup Operators), a group of replicators (Replicator), and a group of guests (Guests), wherein the group of backup operators and the group of replicators are set to maintain the system and will be inactive normally. In addition to the six default privilege groups mentioned above, there are some special privilege members in the operating system, which are set for special purposes, and respectively which are System, Everyone, Creator Owner, etc. All of the special member will not be accommodated by any inbuilt user group and belong to totally independent accounts.

Although the users are restricted differently by their privileges, these restrictions will not be separate from each other, and all of them will operate in response to the same instructions, which provide the user with the foundation to Adjust Token Privilege. To "Adjust Token Privilege" refers to an approach in which a user uses various operating system holes and means to break through a privilege level assigned by the operating system, so as to adjust his or her current privilege up by a plurality of levels and even to the administrator level. The privilege is adjusted successfully on the precondition that there is an error in setting by the administrator (for example, the server is not configured with "the lowest privilege") or there is an emerging overflow hole in the industry (for example, the SYSTEM privilege is obtained directly through an SASS overflow), etc. The common means to Adjust Token Privilege include refreshing a cell phone, the Root privilege of the cell phone, breakout of the cell phone, etc.

With regard to a mobile terminal, an operating system of the terminal will be protected strictly by a manufacturer of the mobile terminal while being shipped from a factory, so a normal program can not obtain any advanced privilege of the operating system, but the advanced privilege can be obtained by taking advantage of a hole of the operating system of the mobile terminal (the topmost privilege of the operating system is obtained upon detecting that the operating system is adjusted in privilege). A privilege management module can be implanted in the mobile terminal with the hole, so that the advanced privilege can be accessed by another program. Moreover, the advanced privilege can be obtained when the mobile terminal is shipped from the factory, through cooperating with the manufacturer of the terminal.

In fact, a program can be injected into the mobile terminal after the advanced privilege of the mobile terminal is obtained, so that any process of the system can be controlled with the injection technology.

Generally a program (a process) can be injected in three possible solutions:

1. Codes are put into a Dynamic Link Library (DLL) and mapped to a remote process using a Windows hook;

2. Codes are put into a DLL and then mapped to a remote process using CreateRemoteThread and LoadLibrary; and 3. Codes are copied directly into a remote process (using WriteProcessMemory (a system process monitor)) and executed by CreateRemoteThread without using any DDL.

It shall be noted that those skilled in the art can inject the program in any one or more of the program injection solutions above, and the embodiment of the disclosure will not limit it herein.

In the embodiment of the disclosure, when the interception program is injected into the notification bar message process, an existing notification bar message processing program in the notification bar message process can be replaced with the interception program, wherein the notification bar message processing program can include a notification bar message sending program, etc. In a particular implementation, the injection of the interception program can be completed by searching for the memory address of the existing notification bar message processing program in the notification bar message process firstly, and then replacing the memory address of the notification bar message processing program with the memory address of the preset interception program. Thus the notification bar message can be intercepted by a notification bar underlying interface without any influence upon normal use of an application.

In reality, the interception program can be a dynamic link library intercepting program. There can be various services in the operating system of the mobile terminal, and in the embodiment of the disclosure, the service refers to a notification bar service. The process in which the notification bar service operates is positioned beforehand in the operating system, the dynamic link library intercepting program is loaded at the position of the process (the dynamic link library intercepting program is loaded into the process in which the service operates, via an Application Programming Interface (API) dlopen (where a dynamic link library is opened in a specified mode) available from the Linux system upon which the Android system is based), and the relevant functions in a browser process is replaced with the relevant functions in the dynamic link library intercepting program.

Of course the injection technology is only illustrative, but those skilled in the art can alternatively replace the connection control program with the interception program via other technologies, and the embodiment of the disclosure will not limit it herein.

It shall be noted that the corresponding functions of the replacing interception program need to realize the same functionalities as the corresponding functions of the replaced notification bar processing program, and a functionality to intercept the notification bar message is added. When the notification bar message is sent by the application, then firstly the interception program will be called to process the notification bar message.

The step 102 is the interception program intercepting a notification bar message satisfying a preset rule, and sends a prompt message, when capturing the notification bar message satisfying the preset rule.

The notification bar message, as its name implies, appears as such a bulletin board set in a neighborhood to send a notification, which is a system message notification area deployed in the Android cell phone operating system to generally present message prompts such as weather, software update, instant messaging, mail prompt, etc. Its presentation form is somewhat like a popup window in a PC operating system or a short message prompt on a cell phone, where if there is some message incoming, then the user will be prompted instantly until the message is checked and closed by the user, and the prompt sign can be removed, but many manufacturers seek for their self-interests from this.

Particularly the notification bar message satisfying the preset rule can include a notification bar message sent by an application with a malicious advertisement plug-in, and a notification bar message containing a malicious advertisement feature.

The mobile terminal will automatically trigger the injected interception program upon being powered on. Subsequently an anti-virus engine can be used to scan applications installed in the mobile terminal (the scan can be initiated any time after the mobile terminal is powered on, and here only a result of the scan will be applied) for a malicious advertisement plug-in to identify in advance whether the application has a risk of sending a notification bar advertisement or not. For an application with a malicious advertisement plug-in, when the interception program captures a notification bar message sent by the application with the malicious advertisement plug-in, the interception program intercepts the notification bar message and sends a prompt message to prompt the user, to thereby notify instantly and on its own initiative the user of the suspicious notification bar message, and to indicate the sender of the message to thereby guide the user in processing the notification bar message.

In a preferred example of this embodiment, the prompt message can include information about the application sending the notification bar message, whether to allow the notification bar message, etc. When the user chooses to allow the notification bar message, a selection instruction of the user is received, and the notification bar message will be displayed; or when the user chooses to forbid the notification bar message, sending the notification bar message is stopped.

In a particular implementation, the interception program can record a selection result by the user on the intercepted notification bar message, and when the same notification bar message is caught again, the interception program cannot inquire the user any more but process the notification bar message directly as chosen previously by the user. In a preferred example of this embodiment, the prompt message can be sent in the form of a popup window or a notification bar message.

On the other hand, for an application without a malicious advertisement plug-in, when capturing a notification bar message sent by the application without a malicious advertisement plug-in, the interception program can determine whether the sent notification bar message contains a malicious advertisement feature, and if the notification bar message contains a malicious advertisement feature, the interception program will intercept the notification bar message and prompt the user. In a preferred example of this embodiment, the malicious advertisement feature can include an advertisement plug-in code feature, and a preset keyword feature. For example, the preset keyword feature is "Welcome for downloading". In a particular implementation, the interception program can alternatively make the determination from some information passed by the application, e.g., an action content in a next step corresponding to the passed notification bar message, and if the content contains a malicious advertisement feature (e.g., popping up a window, or direct downloading a file), then the interception program will stop performing the subsequent operations (no calling an original message sending function) to thereby block the malicious notification bar advertisement from being sent.

If the notification bar message does not contain a malicious advertisement feature, then the interception program will record the behavior of sending notification bar message at this time and provide it to the user, so that the user can determine manually and set whether to intercept the notification bar message.

In reality, when the interception program captures a notification bar message satisfying the preset rule, the interception program may alternatively not prompt the user, but uniformly allow the notification bar message to be sent or uniformly block the notification bar message from being sent, or can alternatively allow the notification bar message to be sent or block the notification bar message from being sent, under a user preset rule.

In an embodiment of the disclosure, when the original notification bar message processing program is replaced with the interception program, the interception program gets an interception logic added besides having all the execution logics of the notification bar message processing program, thus the notification bar message process can execute the process logic, of the original notification bar message sending program, in the interception program to send the notification bar message, upon reception of an instruction that the user determines to allow the notification bar message to be sent.

In a further example of this embodiment, the original notification bar message processing program can be stored at another preset position of the server, and when it is needed to send the notification bar message, the notification bar message processing program can be called again (by jumping to the address where it is stored) to replace the interception program, so as to employ the notification bar message processing program to further perform an access to the website address information and the subsequent operations.

In order to enable those skilled in the art to better understand the embodiment of the disclosure, the embodiment of the disclosure will be described below by way of an example:

(1) The user opens an application, and the application sends a malicious advertisement message during the user's usage;

(2) The interception program determines that the message is a malicious advertisement message, under a preset rule; and (3) The interception program ends the transmission of the advertisement message, to thereby prevent the user of the cell phone from interference.

Figure 2:
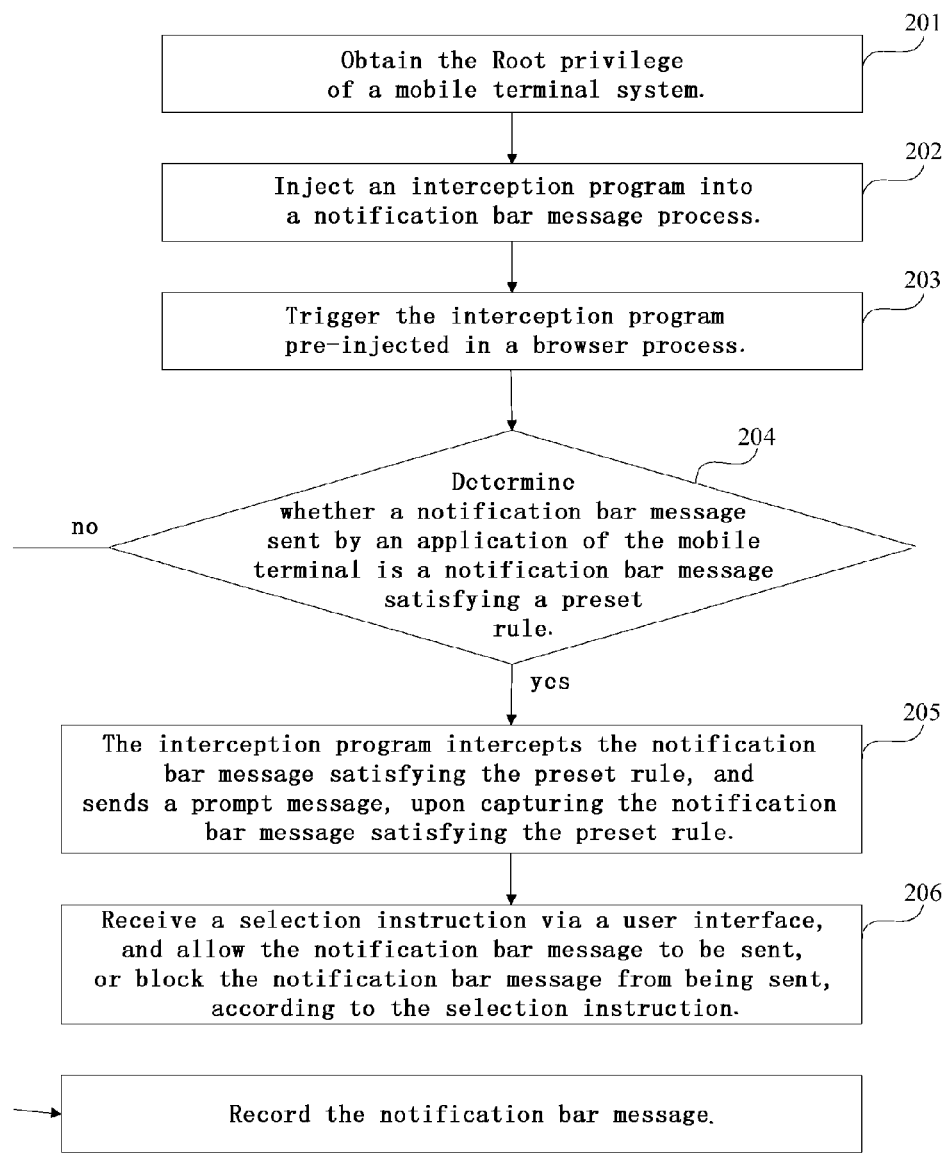
FIG. 2 illustrates schematically a flow diagram of steps in a second embodiment of a method for processing a notification bar message according to an embodiment of the disclosure.

Referring to FIG. 2, there is illustrated a flow chart of steps in a second embodiment of a method for processing a notification bar message according to an embodiment of the disclosure, where the method can particularly include the following steps:

The step 201 is obtaining the Root privilege of a mobile terminal system;

Particularly the Root privilege is one of system privileges, and can be interpreted as the same concept as the SYSTEM privilege but higher than the Administrator privilege, wherein Root is a super administrator user account in the Linux and Unix systems, and if the Root privilege is obtained, it means that the topmost privilege of the mobile terminal has been obtained, and thus any of add, delete, modify and search operations can be performed on any file (including a system file) in the cell phone.

With regard to a mobile terminal, an operating system of the terminal will be protected strictly by a manufacturer of the mobile terminal while being shipped from a factory, so a normal program can not obtain any advanced privilege of the operating system, but the advanced privilege can be obtained by taking advantage of a hole of the operating system of the mobile terminal (the topmost privilege of the operating system is obtained upon detecting that the operating system is adjusted in privilege). A privilege management module can be implanted in the mobile terminals with the hole, so that the advanced privilege can be accessed by another program. Moreover, the advanced privilege can be obtained when the mobile terminal is shipped from the factory, through cooperating with the manufacturer of the terminal.

The step 202 is injecting an interception program into a notification bar message process;

In an embodiment of the disclosure, the interception program can be injected using the injection technology, and any process of the operating system can be controlled using the injection technology. When the interception program is injected into the notification bar message process, an existing notification bar message processing program in the notification bar message process can be replaced with the interception program, wherein the notification bar message processing program can include a notification bar message sending program, etc., in the operating system of the mobile terminal. The corresponding functions of the injected interception program need to realize the same functionalities as the corresponding functions of the replaced notification bar processing program, and a functionality to intercept the notification bar message is added.

In a preferred embodiment of the disclosure, the step 202 can include the following sub-steps:

The sub-step S11 is searching for the memory address of the existing notification bar message processing program in the notification bar message process; and The sub-step S12 is replacing the memory address of the notification bar message processing program with the memory address of the preset interception program.

In a particular implementation, firstly the memory address of the existing notification bar message processing program in the notification bar message process can be searched for, and then the memory address of the notification bar message processing program can be replaced with the memory address of the preset interception program to thereby inject the interception program.

The step 203 is triggering the interception program pre-injected in a browser process.

In a particular implementation, the injected interception program will be started together with the browser process.

The step 204 is determining whether a notification bar message sent by an application of the mobile terminal is a notification bar message satisfying a preset rule; and if yes, then the flow proceeds to the step 205;

Wherein, the notification bar message satisfying the preset rule can include a notification bar message sent by an application with a malicious advertisement plug-in, and a notification bar message containing a malicious advertisement feature.

In a preferred embodiment of the disclosure, the step 204 can particularly include the following sub-steps:

The sub-step S21 is scanning applications in the mobile terminal to determine whether the application has a malicious advertisement plug-in, and if yes, then the flow proceeds to the sub-step S22; otherwise, the flow proceeds to the sub-step S23;

The sub-step S22 is determining that the notification bar message sent by the application is a notification bar message satisfying the preset rule;

The sub-step S23 is the interception program determining whether the sent notification bar message contains a malicious advertisement feature, upon capturing the notification bar message sent by the application without a malicious advertisement plug-in; and if yes, then the flow proceeds to the sub-step S22; otherwise, the flow proceeds to the sub-step S24; and The step S24 is the interception program recording the notification bar message.

The step S205 is the interception program intercepting the notification bar message satisfying the preset rule, and sending a prompt message, upon capturing the notification bar message satisfying the preset rule.

In a particular application scenario, after intercepting the notification bar message, the interception program sends a prompt message timely to warn the user about the suspicious notification bar message, and to indicate the information about the application sending the notification bar message (the sender of the message) to thereby guide the user in processing the notification bar message.

The step 206 is receiving a selection instruction via a user interface, and allowing the notification bar message to be sent, or blocking the notification bar message from being sent, according to the selection instruction.

Particularly if the application has been specified manually by the user as a program to be intercepted, then the interception program will stop directly performing the subsequent operations, to thereby block the notification bar message from being sent.

Since the embodiment of the method in FIG. 2 is substantially the same as the embodiment of the method in FIG. 1, a description thereof has been simplified, and reference can be made to the corresponding description of the embodiment of the method in FIG. 1 for details thereof.

It shall be noted that the respective embodiments of the method have been described as a series of actions in combination for the sake of a simplified description, but those skilled in the art shall appreciate that the disclosure will not be limited to any order of the actions described above, because some of the steps can be performed in another order or concurrently without departing from the scope of the disclosure. Secondly those skilled in the art shall also appreciate that the respective embodiments of the disclosure described in this specification are preferred embodiments, and the actions and the modules involved therein may not be necessarily required for the disclosure.

Figure 3:
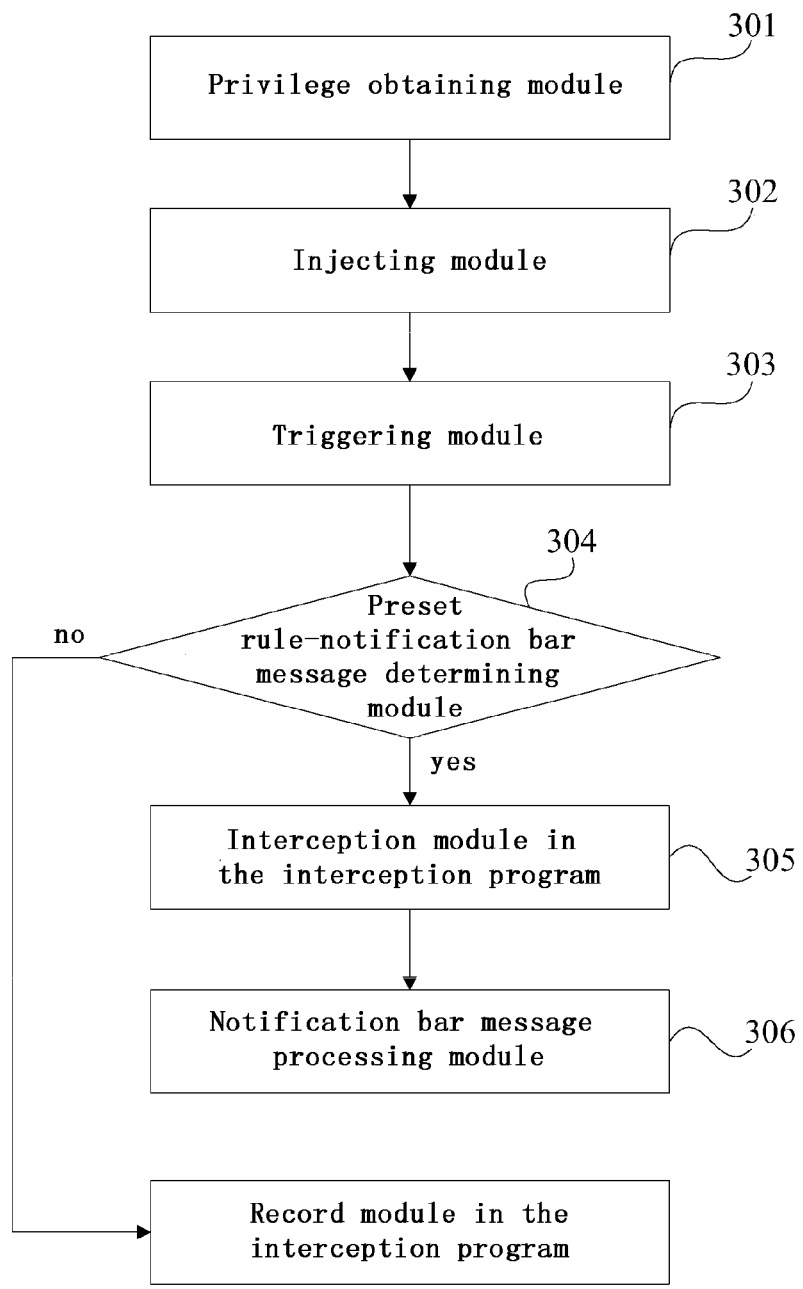
FIG. 3 illustrates schematically a structural diagram of an embodiment of a device for processing a notification bar message according to an embodiment of the disclosure.

Referring to FIG. 3, there is illustrated a structural block diagram of an embodiment of a device for processing a notification bar message according to an embodiment of the disclosure, where the device can particularly include the following modules:

A privilege obtaining module 301 is configured to obtain a Root privilege of a mobile terminal system;

An injecting module 302 is configured to inject an interception program in a notification bar message process;

In a preferred embodiment of the disclosure, the injecting module 302 can include the following modules:

A memory address searching module is configured to search for the memory address of an existing notification bar message processing program in the notification bar message process, and A memory address replacing module is configured to replace the memory address of the notification bar message processing program with the memory address of the preset interception program;

A triggering module 303 is configured to trigger the interception program pre-injected in the notification bar message process;

A preset rule-notification bar message determining module 304 is configured to determine whether a notification bar message sent by an application of the mobile terminal is a notification bar message satisfying a preset rule; and if yes, to call an interception module 305 in the interception program; otherwise, to call a record module in the interception program;

In a preferred example of this embodiment, the notification bar message satisfying the preset rule can include a notification bar message sent by an application with a malicious advertisement plug-in, and a notification bar message containing a malicious advertisement feature.

In a preferred embodiment of the disclosure, the preset rule-notification bar message determining module 304 can include the following module:

A malicious advertisement plug-in scanning module is configured to scan applications in the mobile terminal to determine whether the application has a malicious advertisement plug-in, and if yes, to call a confirming module; otherwise, to call a malicious advertisement feature determining module, The confirming module is configured to determine that the notification bar message sent by the application is the notification bar message satisfying the preset rule, The malicious advertisement feature determining module is configured to determine whether the sent notification bar message contains a malicious advertisement feature, upon capturing the notification bar message sent by the application without a malicious advertisement plug-in; and if yes, to call the confirming module; otherwise, to call the record module in the interception program, In a preferred example of this embodiment, the malicious advertisement feature can include an advertisement plug-in code feature, a preset keyword feature, and The record module in the interception program is configured to record the notification bar message; and The interception module 305 in the interception program is configured to intercept the notification bar message satisfying the preset rule and to send a prompt message, when capturing the notification bar message satisfying the preset rule.

In a preferred example of this embodiment, the prompt message can include information about the application sending the notification bar message, information about whether to allow the notification bar message, etc.; and A notification bar message processing module 306 is configured to receive a selection instruction via a user interface, and to allow the notification bar message to be sent, or to block the notification bar message from being sent, according to the selection instruction.

Since the embodiment of the device in FIG. 3 is substantially the same as the embodiment of the method above, a description thereof has been simplified, and reference can be made to the corresponding description of the embodiment of the method for details thereof.

Figure 4:
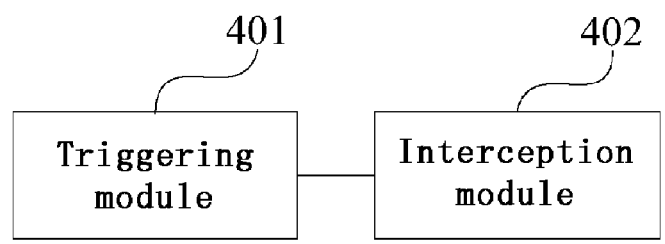
FIG. 4 illustrates schematically a structural diagram of an embodiment of a system for processing a notification bar message according to an embodiment of the disclosure.

Referring to FIG. 4, there is illustrated a structural block diagram of an embodiment of a system for processing a notification bar message according to an embodiment of the disclosure, and the system can particularly include a triggering module 401 and an intercepting module 402, where:

The triggering module 401 is configured to trigger an interception program pre-injected into a notification bar message process; and The intercepting module 402 is configured to determine whether a notification bar message is a notification bar message satisfying a preset rule, upon capturing the notification bar message, to intercept the notification bar message satisfying the preset rule, and to send a prompt message.

Particularly the mobile terminal will trigger automatically the injected interception program upon being powered on. Subsequently a anti-virus engine can scan applications installed in the mobile terminal (the scan can be initiated any time after the mobile terminal is powered on, and here only a result of the scan will be applied) for a malicious advertisement plug-in to identify in advance whether the application has a risk of sending a notification bar advertisement or not. For an application with a malicious advertisement plug-in, when the interception program captures a notification bar message sent by the application with the malicious advertisement plug-in, the interception program intercepts the notification bar message, and sends a prompt message to prompt the user.

On the other hand, for an application without a malicious advertisement plug-in, when capturing a notification bar message sent by the application without a malicious advertisement plug-in, the interception program determine whether the sent notification bar message contains a malicious advertisement feature, and if the notification bar message contains a malicious advertisement feature, then the interception program will intercept the notification bar message and prompt the user. If the notification bar message does not contain a malicious advertisement feature, then the interception program will record the behavior of sending notification bar message at this time and provide it to the user, so that the user can determine manually and set whether to intercept the notification bar message or not.

Since the embodiment of the device in FIG. 4 is substantially the same as the embodiment of the method above, a description thereof has been simplified, and reference can be made to the corresponding description of the embodiment of the method for details thereof.

The respective components in the embodiments of the disclosure can be embodied in hardware or in software modules being run in one or more processors or in any combination of both. Those skilled in the art shall appreciate that some or all of the functions of some or all of the components in the device for processing a communication request of a mobile terminal according to the embodiment of the disclosure can be performed in a microprocessor or a Digital Signal Processor (DSP) in practice. The disclosure can also be embodied as a device or apparatus program (e.g., a computer program and a computer program product) for performing a part or all of the method described here. Such a program in which the disclosure is embodied can be stored on a computer readable medium or can be embodied in the form of one or more signals. The signal or signals can be downloaded from a website on the Internet or can be available on a carrier signal or can be provided in any other form.

Figure 5:
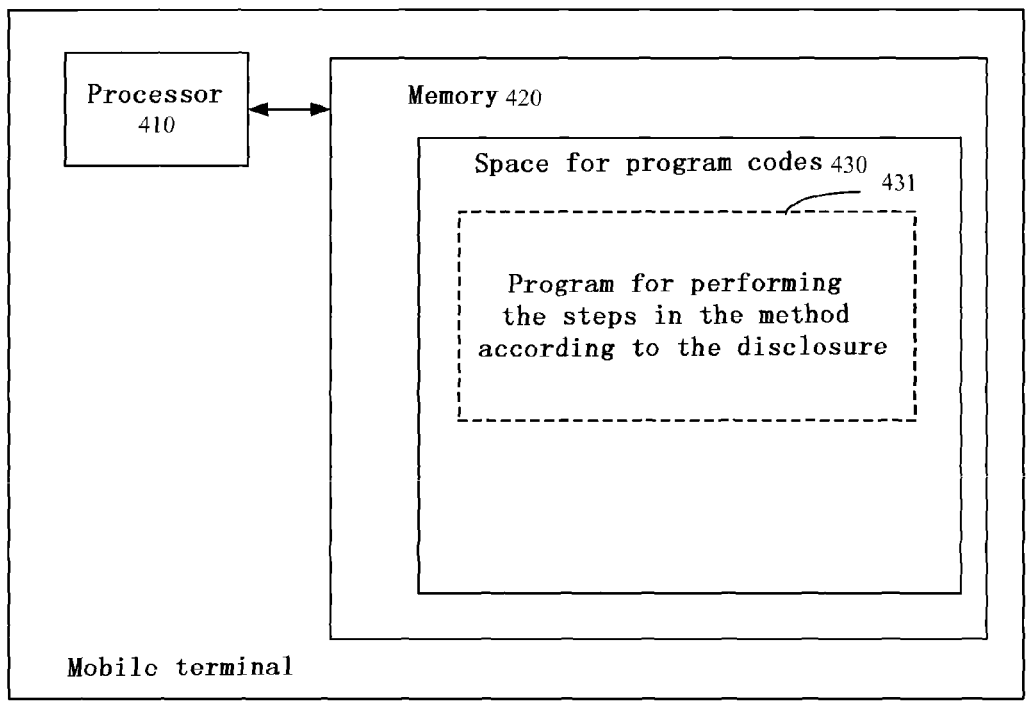
FIG. 5 illustrates schematically a block diagram of a mobile terminal for performing the method according to the disclosure.
Figure 6:
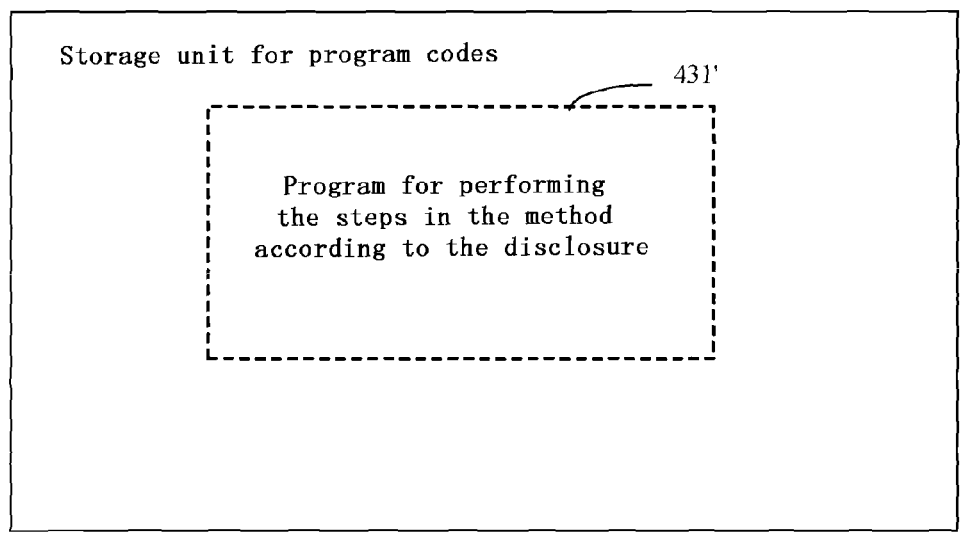
FIG. 6 illustrates schematically a storage unit for holding or carrying program codes to perform the method according to the disclosure.

For example, FIG. 5 illustrates a mobile terminal performing the method according to the disclosure. The mobile terminal traditionally includes a processor 410, and a computer program product or a computer readable medium in the form of a memory 420. The memory 420 can be an electronic memory, e.g., a flash memory, an Electrically Erasable Programmable Read Only Memory (EEPROM), an EPROM, a hard disk, an ROM, etc. The memory 420 is provided with a storage space 430 including for program codes 431 to perform any of the steps in the method above. For example, the storage space 430 for the program codes can include respective program codes 431 for performing the respective steps in the method above respectively. These program codes can be read from or written into one or more computer program products including a program code carrier, e.g., a hard disk, a Compact Disk (CD), a memory card, a floppy disk, etc. The computer program product or products is or are typically a portable or fixed storage unit as illustrated in FIG. 6. The storage unit can be provided with storage segments, a storage space, etc., arranged similarly to the memory 420 in the terminal illustrated in FIG. 5. The program codes can be compressed in an appropriate form, for example. Typically the storage unit includes computer readable codes 431', i.e., codes which can be read by a processor, e.g., the memory 410, etc., and which upon being executed by the terminal cause the terminal to perform the respective steps in the method described above.

"One embodiment", "an embodiment" or "one or more embodiment" as referred to in this context means that a particular feature, structure or feature described in connection with the embodiment is included in at least one embodiment of the disclosure. Moreover it shall be noted that the instances of the phrase "in one embodiment" may not necessarily all refer to the same embodiment.

Numerous particular details have been described in the description here. However, it shall be appreciated that the embodiments of the disclosure can be put into practice without these particular details. In some examples, well-known methods, structures and technologies have not bee illustrated in details so as not to obscure understanding of the description.

It shall be noted that the embodiments above are merely for the purpose of illustrating the disclosure but not intended to limit the disclosure, and those skilled in the art can devise alternative embodiments without departing from the scope of the appended claims. Any reference numerals placed between parentheses in the claims shall not be construed as limiting the scope of the disclosure. The term "comprises/comprising" shall not preclude the presence of an element or a step which has not been listed in any claim. The term "a/an" preceding an element shall not preclude the presence of a plurality of such elements. The disclosure can be embodied in hardware including several different elements or in an appropriately programmed computer. In any claim in which several units of a device are listed, several of the units can be embodied particularly in the same item of hardware. The use of the terms "first", "second", "third", etc., shall not suggest any particular order, but these terms can be interpreted as names.

Moreover it shall be noted that the languages used in the description have been selected primarily for the purpose of intelligibility and teaching but not to define or limit the subject of matter of the disclosure. Accordingly numerous modifications and variations will occur to those ordinarily skilled in the art without departing from the scope and spirit of the appended claims. The disclosure of the disclosure is illustrative of but not limiting the scope of the disclosure as defined in the appended claims.

What is claimed is:

1. A method for processing a notification bar message, the method comprising:
   injecting an interception program into a notification bar message process by searching for a memory address of an existing notification bar message processing program in the notification bar message process, and replacing a memory address of the notification bar message processing program with the memory address of the preset interception program;
   triggering the interception program pre-injected into the notification bar message process; and
   capturing, by the interception program, a notification bar message satisfying a preset rule, the interception program intercepting the notification bar message satisfying the preset rule, and
   sending a prompt message, the notification bar message comprising a system message notification area deployed in an Android cell phone operating system.

2. The method according to claim 1, wherein the notification bar message satisfying the preset rule comprises a notification bar message sent by an application with a malicious advertisement plug-in, and a notification bar message containing a malicious advertisement feature, and before the interception program intercepts the notification bar message satisfying the preset rule and sends the prompt message, the method further comprises:
   determining whether the notification bar message sent by the application of a mobile terminal is a notification bar message satisfying the preset rule, which comprises:
   scanning applications in the mobile terminal to determine whether the application has a malicious advertisement plug-in; and
   if the application has a malicious advertisement plug-in, determining that the notification bar message sent by the application with the malicious advertisement plug-in is a notification bar message satisfying the preset rule, if the application has no malicious advertisement plug-in, the interception program determining whether the sent notification bar message contains a malicious advertisement feature when capturing the notification bar message sent by the application without a malicious advertisement plug-in, and if the sent notification bar message contains a malicious advertisement feature, determining that the notification bar message is a notification bar message satisfying the preset rule.

3. The method according to claim 2, further comprising:

when the sent notification bar message does not contain the malicious advertisement feature, the interception program recording the notification bar message.

4. The method according to claim 1, wherein the prompt message comprises information about whether to allow the notification bar message, and the method further comprises:

receiving a selection instruction via a user interface; and allowing the notification bar message to be sent, or blocking the notification bar message from being sent, according to the selection instruction.

5. The method according to claim 1, wherein before injecting the interception program into the notification bar message process, the method further comprises:

obtaining a Root privilege of a mobile terminal system.

6. The method according to claim 4, wherein the prompt message further comprises information about an application sending the notification bar message.

7. The method according to claim 2, wherein the malicious advertisement feature comprises an advertisement plug-in code feature and a preset keyword feature.

8. A device for processing a notification bar message, the device comprising:

one or more non-transitory computer readable media configured to store computer-executable instructions;

at least one processor to execute a plurality of software modules configured to execute the computer-executable instructions to cause:

injecting an interception program into a notification bar message process by searching for a memory address of an existing notification bar message processing program in the notification bar message process, and replacing a memory address of the notification bar message processing program with the memory address of the preset interception program;

triggering the interception program pre-injected in the notification bar message process; and capturing a notification bar message satisfying a preset rule, intercepting the notification bar message satisfying the preset rule, and sending a prompt message, the notification bar message comprising a system message notification area deployed in an Android cell phone operating system.

9. The device according to claim 8, wherein the notification bar message satisfying the preset rule comprises a notification bar message sent by an application with a malicious advertisement plug-in, and a notification bar message containing a malicious advertisement feature, and the processor executes at least one of the software modules configured to execute the computer-executable instruction to cause:

before the interception program intercepts the notification bar message satisfying the preset rule and sends the prompt message, determining whether the notification bar message sent by the application of a mobile terminal is a notification bar message satisfying the preset rule, which comprises:

scanning applications in the mobile terminal to determine whether the application has a malicious advertisement plug-in, and if yes, confirming that the notification bar message sent by the application is a notification bar message satisfying the preset rule;

otherwise, determining whether the sent notification bar message contains a malicious advertisement feature when capturing the notification bar message sent by the application without a malicious advertisement plug-in; and if yes, confirming that the notification bar message sent by the application is a notification bar message satisfying the preset rule.

10. The device according to claim 9, the processor executes at least one of the software modules configured to execute the computer-executable instruction to cause:

recording the notification bar message when the sent notification bar message does not contain the malicious advertisement feature.

11. The device according to claim 8, wherein the prompt message comprises information about whether to allow the notification bar message, and the processor executes at least one of the software modules configured to execute the computer-executable instruction to cause:

receiving a selection instruction via a user interface; and allowing the notification bar message to be sent, or blocking the notification bar message from being sent, according to the selection instruction.

12. The device according to claim 8, wherein the processor executes at least one of the software modules configured to execute the computer-executable instruction to cause:

obtaining a Root privilege of a mobile terminal system before the interception program is injected into the notification bar message process.

13. The device according to claim 11, wherein the prompt message further comprises information about an application sending the notification bar message.

14. The device according to claim 9, wherein the malicious advertisement feature comprises an advertisement plug-in code feature and a preset keyword feature.

15. A non-transitory computer readable recording medium having instructions stored thereon that, when executed by at least one processor, cause the at least one processor to perform a method for processing a notification bar message, which comprises:

injecting an interception program into a notification bar message process by searching for a memory address of an existing notification bar message processing program in the notification bar message process, and replacing a memory address of the notification bar message processing program with the memory address of the preset interception program;

triggering the interception program pre-injected into the notification bar message process; and capturing, by the interception program, a notification bar message satisfying a preset rule, the interception program intercepting the notification bar message satisfying the preset rule, and sending a prompt message, the notification bar message comprising a system message notification area deployed in an Android cell phone operating system.

* * * * *